July 12, 1949.　　　　C. H. JACOBSON　　　　2,475,898
FOOTAGE INDICATOR FOR PHOTOGRAPHIC APPARATUS
Filed May 20, 1947　　　　　　　　　　　　　　2 Sheets-Sheet 2

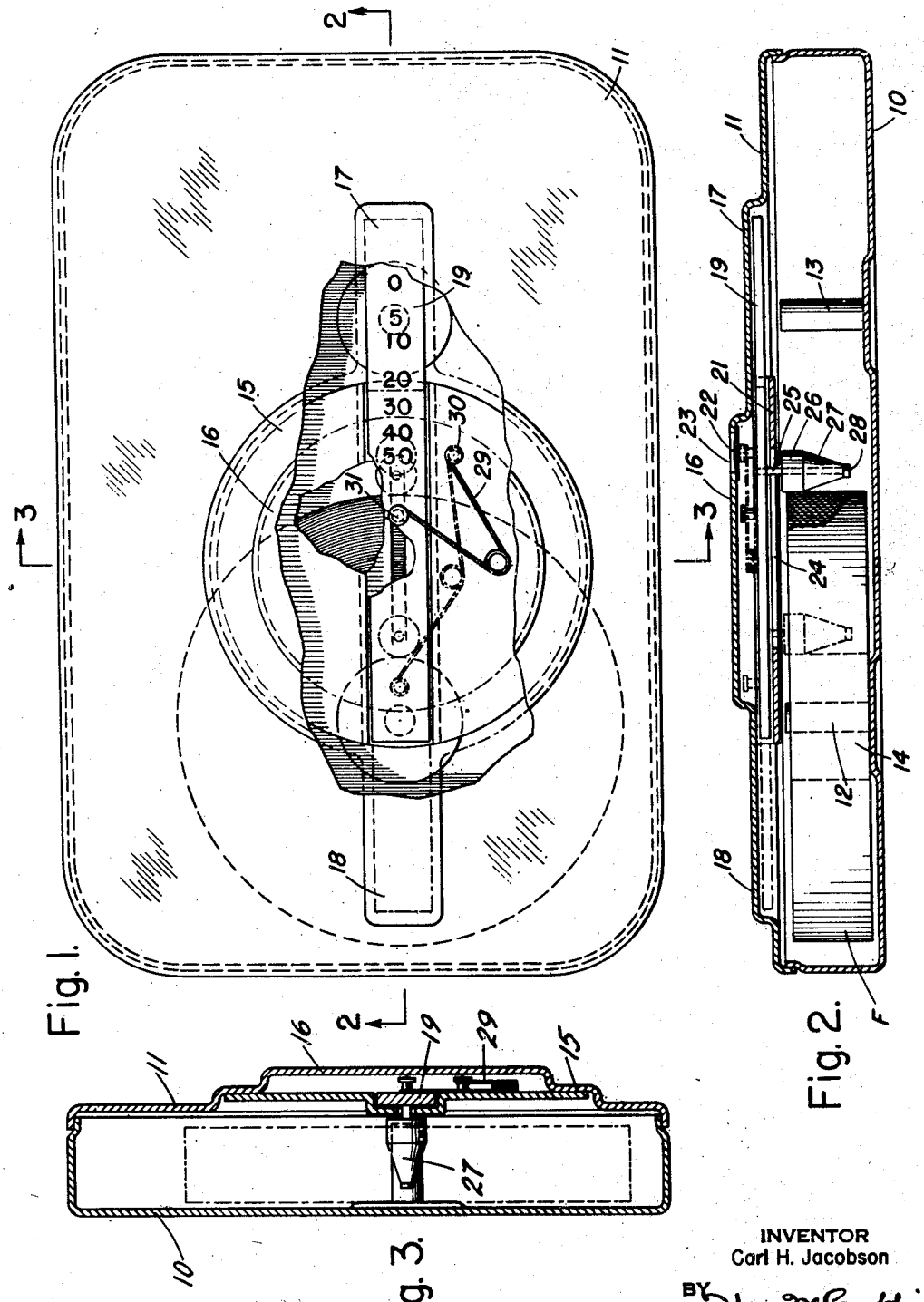

INVENTOR
Carl H. Jacobson
BY
ATTORNEY

Patented July 12, 1949

2,475,898

UNITED STATES PATENT OFFICE 2,475,898

FOOTAGE INDICATOR FOR PHOTOGRAPHIC APPARATUS

Carl H. Jacobson, Binghamton, N. Y., assignor to General Aniline & Film Corporation, New York, N. Y., a corporation of Delaware Application May 20, 1947, Serial No. 749,165

6 Claims. (Cl. 33—172)

This application pertains to an invention in a footage indicator for photographic apparatus such as movie cameras or magazines for movie cameras.

Among the objects of the invention is that of devising a very simple and positively actuated means for measuring and indicating the quantity of film on a film roll.

It is another object of the invention to devise a footage indicator for photographic apparatus which shall comprise a minimum number of parts, especially of movable parts.

Another object of the invention is that of devising a footage indicator which shall bear against the periphery of a roll of film with a minimum of pressure, yet which shall be effective to indicate correctly the number of feet of film still available for exposure.

Another object of the invention is that of devising a footage indicator for photographic apparatus such as moving picture camera magazines which shall offer a minimum of complication to the assembly of the magazine cover to the casing after loading, and which shall obviate any likelihood of damaging the film, or of assembling the mechanism improperly even though that operation is performed in total darkness.

Another object of the invention is that of devising a footage indicator for photographic apparatus of the type described which shall comprise a minimum number of parts and yet which shall, although indications are visible from the exterior of the apparatus, permit entry of no light into the interior thereby to fog the enclosed film.

Other objects of the invention will be apparent from the following disclosure.

The invention is hereinafter described by reference to one particular embodiment thereof as evidenced in the accompanying figures of drawing, wherein:

Fig. 1 is an elevation of a magazine for a moving picture camera to which the invention has been applied.

Fig. 2 is a longitudinal section taken at line 2—2, Fig. 1.

Fig. 3 is a transverse section through the magazine of Fig. 1 and taken at line 3—3.

Figure 4:
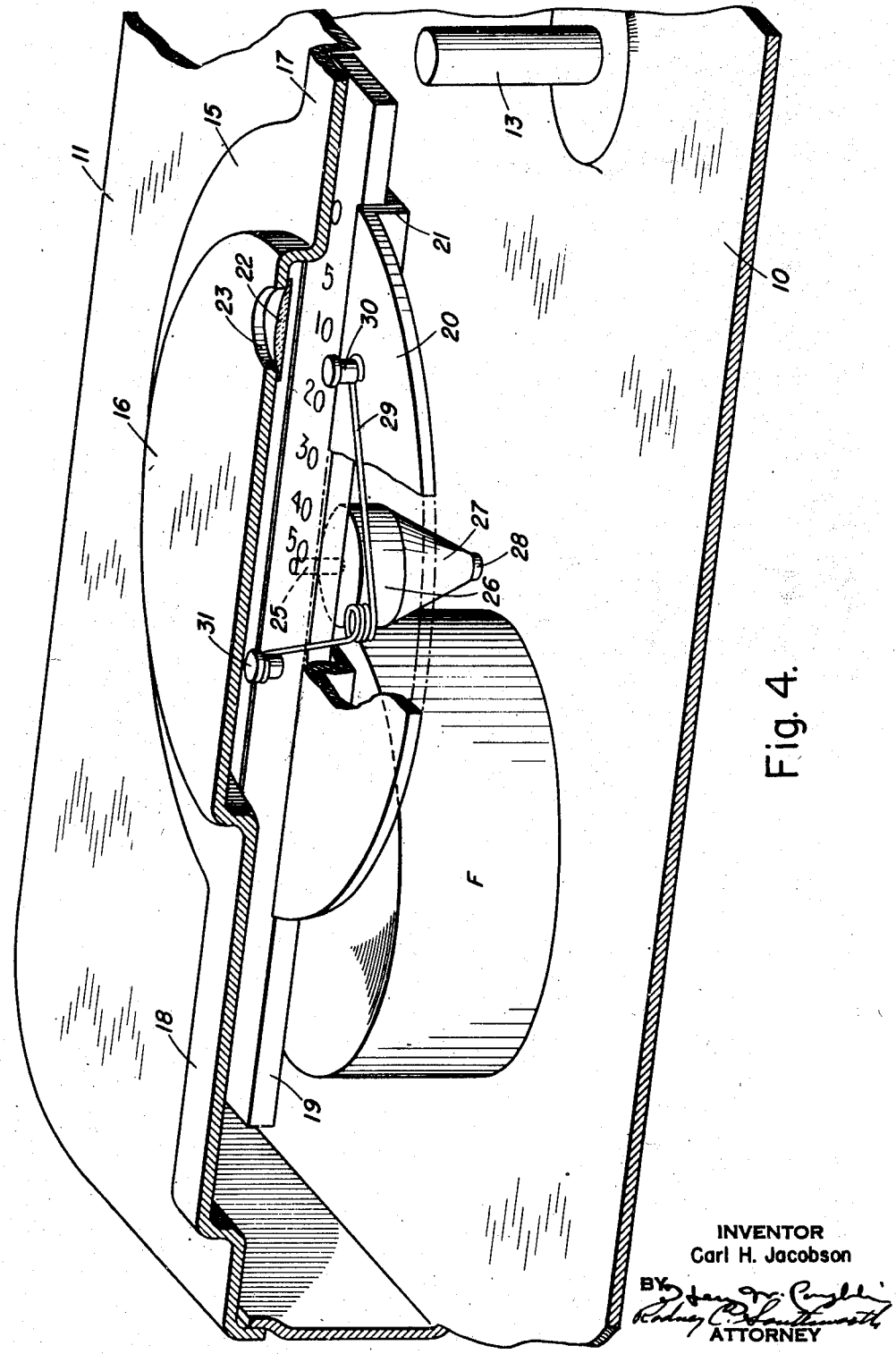
Fig. 4 is a perspective of the footage indicator as applied to the magazine of Fig. 1, certain parts having been broken away more clearly to show the detailed construction.

Now referring to the figures of drawing, the invention has been applied to a magazine such as is employed within amateur type moving picture cameras, although it is to be understood that it is applicable to other magazines, or may be applied to moving picture apparatus not specifically designated as a film magazine, for example, to the casing and cover of any photographic apparatus containing a film supply which is withdrawn therefrom for exposure, projection or other purposes.

The magazine comprises a casing 10 and a cover 11, the casing having therein studs or axes 12 and 13 upon which may be rotatably mounted cores or spools adapted to have wound thereon a supply of motion picture film. As shown here, the supply of film F is wound upon a core 14 rotatably mounted on the stud 12. As is well known to those skilled in the art, as the film is exposed, it is withdrawn from the supply roll and after passing at a predetermined rate through an exposure aperture, is taken up or wound on a similar core on stud 13. The take-up core is rotated by appropriate means not a part of the present invention and, therefore, not necessarily to be described here.

Since these film containing magazines are inserted within the camera, and are operated in such a manner as to take a number of scenes during the exposure of the contained film, it is obviously of advantage to be able to ascertain at any time, the amount of film still remaining on the supply roll or remaining to be exposed. The prior art contains various devices intended for the same purpose, however the one herein described and claimed is unique in that it comprises a minimum number of parts especially a minimum number of movable parts. It is a further characteristic of the present invention that these parts are disposed to be moved in a straight line pathway, thereby greatly simplifying the construction of parts and making the entire assembly less costly.

The cover 11 which forms with the casing 10, a light-tight closure for the film, has to be fitted on the casing in total darkness and the roll contacting means must be assembled in a particular relationship to the film, and the inherent tendency of the mechanism would normally locate the parts at an improper position for ready assembly when the supply roll is full. The construction hereinafter described in greater detail eliminates this disadvantage and makes it possible to assemble the cover to the casing without special tools and without danger of improperly positioning the parts or of damaging the film.

The cover is embossed to form a central, circular upraised portion 15, that portion, in turn, having a second concentric raised part 16. Rectangular embossings 17 and 18 extend at either end of the circular raised portion 16 and are of similar height above the surface of the cover. These embossings 17 and 18 are of a width sufficient to accommodate a bar or strip 19 which is freely movable lengthwise within the grooves formed by the said embossings. At the interior of the cover a plate 20 of a diameter just sufficient to fill the interior of the circular embossing 15 is riveted or otherwise permanently attached thereto. This plate has a channel portion 21 in alignment with the embossings 17 and 18. Channeled portion 21 is thus complementary to the grooves formed by embossings 17 and 18 and completes the guideway within which the strip 19 is retained, but within which it is free to move lengthwise of the structure.

The strip 19 has printed thereon a series of non-consecutive numerals from 0–50, these numerals being visible from the exterior of the magazine through a window 22 cemented or otherwise fixed within or beneath a circular or other opening 23 in the central embossing 16. The numerals 0–50 are merely illustrative of the range of the one particular footage indicator as applied to a typical magazine containing 50 feet of film. If the magazine is adapted to hold more or less film, then the graduations are modified accordingly. If desired, the window may have cut therein an index mark against which the footage numerals may be read.

The channeled portion 21 of plate 20 is provided with an elongated slot 24 through which projects a pivot pin 25 fixed in the strip 19 and carrying freely rotatable thereon, a film engaging contact roll having a cylindrical portion 26 and a conical portion 27. The pin 25 is headed over at 28 after the parts have been assembled. The conical part of this contact roller facilitates its engagement with the film when the cover and case are assembled.

For urging the strip 19 in one direction, a hairpin spring 29 is attached at one end to a rivet 30 fixed in the plate 20 and at its other end to a similar rivet 31 fixed in the strip. The said spring is tensioned so as to straighten to the dot-and-dash-line position of Fig. 1, in which position the zero passes beneath the window 22 as the cylindrical portion 26 of the contact roller bears against the core 14 for the film supply. Of course, that shows that all film has been withdrawn and exposed. At other times, the spring always presses the contact roller into engagement with the periphery of the supply roll and, depending upon the diameter thereof, the appropriate numeral indicating the remaining number of feet of film on the core will be positioned beneath window 22.

The window 22 is preferably of a color to absorb or reflect a large part of the actinic light and the underlying numerals on the strip 19 must be of a color to be seen through the window. The camera in which a magazine of this type is employed has a second window with which that of the magazine registers and through which the numerals are viewed.

To assemble the cover to the casing after the latter has been loaded and threaded, it is moved to a position in which it aligns approximately laterally with the casing, but is offset lengthwise thereof so that the tapered or conical end of the contact roller is beyond the film roll. At such time the spring 29 will maintain the strip 19 at the zero position, and, of course, if the cover were to be aligned more or less directly with the casing and then an attempt made to move it to position, there would be a physical conflict between the roller and the supply roll preventing assembly and damaging the film. So long as the cover is longitudinally offset in a direction away from the center of the supply roll for a distance a little greater than the radius of the supply roll, it may be moved downwardly until the conical portion 27 of the roller can be felt against the periphery of the film. Then the cover is moved to full engagement with the casing simultaneously compressing spring 29 until the indicator stops at the 50 mark. In that position, the cylindrical portion 26 of the roller bears against the film, the conical portion serving only to facilitate assembly.

While a particular type of spring has been shown and described by way of example, other springs may be substituted. The numerals are preferably applied to the strip and the small, circular window is of a size to show a numeral at all times. The interval between numerals may be one of ten feet, or may be shorter, especially at the zero end of the scale. However, this may be reversed and the numerals applied to an elongated window while the strip carries only an index mark. The window, preferably of plastic material, is either red or green, preferably the latter and the numerals show clearly if of either white or black since it is not necessary that the window be highly absorptive of light, except that which is most highly actinic photographically.

The tight fit of the plate 20 within the embossed recess 15 and the small clearances between the strip 19 and its guiding groove coupled with the extremely circuitous path which light must necessary follow after it enters the window and before it could reach the interior of the casing makes it practically impossible to fog the film through the footage indicator.

This indicator is easily checked upon reloading the magazine and while of such rugged construction that damage is very unlikely, if repair is necessary, the fact is easily ascertainable and the necessary restoration quickly effected.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. In a photographic apparatus, a casing, a cover for said casing and a supply roll of film rotatively carried within said casing, and means carried by and forming a portion of said cover for measuring and indicating the length of film in said supply roll comprising an externally embossed channel in said cover, a plate closing at least a portion of said channel interiorly of said cover and providing therewith a guideway for a rectilinearly slidable indicator member, cooperating index means and footage indicia on said member and cover so disposed as to be observed from outside the casing and cover, contact means carried by said member and engageable with the surface of said film roll and resilient means attached to said member and to a portion of the cover and tensioned to urge the member in a direction to maintain the contact means in engagement with the periphery of the film roll.

2. In a photographic apparatus, a casing, a cover for said casing and a supply roll of film rotatively carried within said casing, and means carried by and forming a portion of said cover for measuring and indicating the length of film in said supply roll comprising an externally embossed channel in said cover, a plate closing at least a portion of said channel interiorly of said cover and providing therewith a guideway for a rectilinearly slidable indicator member, a window in said cover and footage indicia on the slidable indicator member positioned to show through said window, contact means carried by said member and engageable with the surface of said film roll, a resilient means attached to said member and to a portion of the cover and tensioned to urge the member in a direction to maintain the contact means in engagement with the periphery of the film roll.

3. In a photographic apparatus, a casing, a cover for said casing and a supply roll of film rotatively carried within said casing, and means carried by and forming a portion of said cover for measuring and indicating the length of film in said supply roll comprising outwardly directed embossings in said cover, said embossings including rectangular portions extending longitudinally of the cover from an intermediate, circular embossed portion, a plate set in said circular embossed portion and having therein a groove in alignment with the rectangular embossed parts of the cover, a slide movable lengthwise of the cover in the said groove and embossed portions thereof, a spring attached at one end to the slide and at its other end to a fixed portion of the cover for biasing the slide in one direction, a window in the embossed portion of the cover and footage indicia on the slide positioned to be observed through said window, and a film roll engaging member including a pin projecting from said slide and a roller thereon, said roller having a cylindrical portion and a tapered portion extending from said cylindrical portion.

4. In a photographic apparatus, a casing, a cover for said casing and a supply roll of film rotatively carried within said casing, and means carried by and forming a part of said cover for measuring and indicating the length of film in said supply roll comprising raised exteriorly embossed portions including a central, circular embossing and rectangular embossings extending longitudinally of the cover in each direction from the central embossing, a plate attached beneath the circular embossed portion of the cover closing that circular area and having therein guide means cooperating with the rectangular embossings in the cover for forming a guideway within which is slidably mounted an indicator strip, an elongated slot in said circular plate, a pin fixed in said strip and projecting through said slot, and a film roll engaging member comprising a cylindrical portion adjacent the slotted plate, said cylindrical portion extending away from the strip and tapering to a diameter substantially smaller than that of the cylindrical portion, spring means for urging said indicator slide in a direction to maintain the roll engaging member in contact with the perhiphery of said film roll, footage indicia on said strip and a window in the embossed portion of said cover through which said indicia may be observed and so positioned that the indicia observed in the center of the window indicates the amount of film still remaining on the said roll.

5. In a photographic apparatus, a casing, a cover for said casing, and a supply roll of film rotatively carried within said casing, and means carried by and forming a portion of said cover for measuring and indicating the length of film in said supply roll comprising an externally embossed channel in said cover, a plate closing at least a portion of said channel interiorly of said cover and providing therewith a guideway for a rectilinearly slidable idicator member, cooperating index means and footage indicia on said member and cover so disposed as to be observed from outside the casing, contact means including a roller, part of which is cylindrical and a continuing portion of which tapers from said cylindrical portion to an end of substantially less diameter than that of the cylindrical portion, carried by said member and engageable with the surface of said film roll, and resilient means attached to said member and to a portion of the cover and tensioned to urge the member in a direction to maintain the contact means in engagement with the periphery of the film roller.

6. In a photographic apparatus, a casing, a cover for said casing and a supply roll of film rotatively carried within said casing, and means carried by and forming a portion of said cover for measuring and indicating the length of film in said supply roll comprising outwardly directed embossings in said cover, said embossings including rectangular portions extending longitudinally of the cover, an intermediate, circular embossed portion, and a second circular embossed portion struck outwardly from the first and of smaller diameter than that portion, a plate set in said first mentioned circular embossed portion and having therein a groove in alignment with the rectangular embossings, a measuring and indicating slide movable lengthwise of the cover and guided within said groove in the plate and rectangular embossed portions of the cover, indicia on said slide and a window in the smaller embossed portion of the cover in alignment with said indicia and through which it may be observed from outside the casing to indicate the amount of film remaining on a film roll, a film roll engaging member movable with said slide and including a pin projecting therefrom and extending through an elongated slot in the grooved portion of said plate, a roller on said pin having at one end a cylindrical portion and being tapered from that portion to a substantially smaller diameter at the opposite end, and a spring anchored at one end to said slide and at the other end to said plate and tensioned to urge the slide in a direction to maintain the roll engaging member in contact with the periphery of the film roll, the footage of which is to be indicated.

CARL H. JACOBSON.

REFERENCES CITED

The following references are of record in the file of this patent:

UNITED STATES PATENTS

| Number | Name | Date |
|---|---|---|
| 1,538,510 | Bonk | May 9, 1925 |
| 1,812,068 | Victor | June 30, 1931 |